F. W. C. POHLE.
PHOTOGRAPHIC POSING DEVICE.
APPLICATION FILED MAR. 13, 1908.
908,800.
Patented Jan. 5, 1909.
2 SHEETS—SHEET 1.
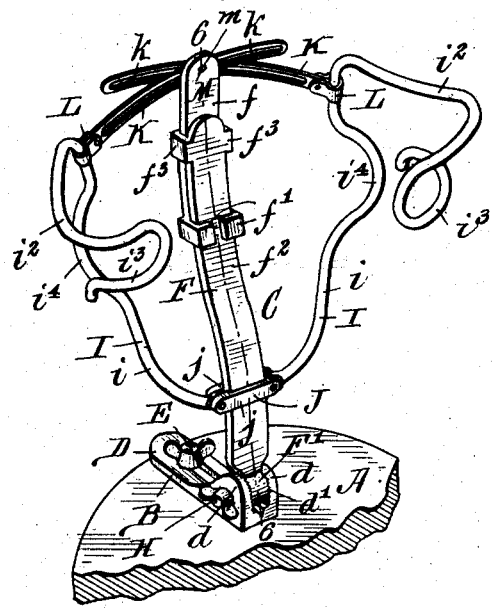
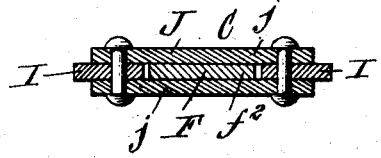
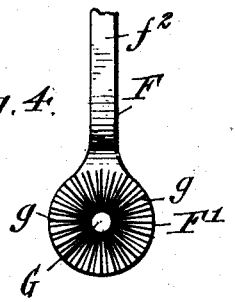
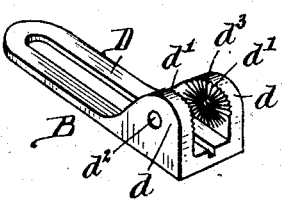
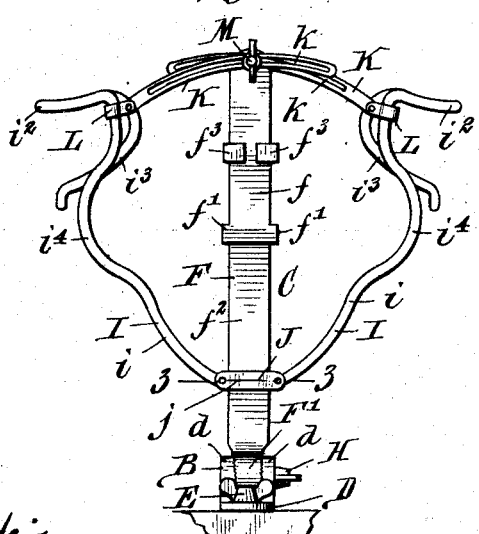
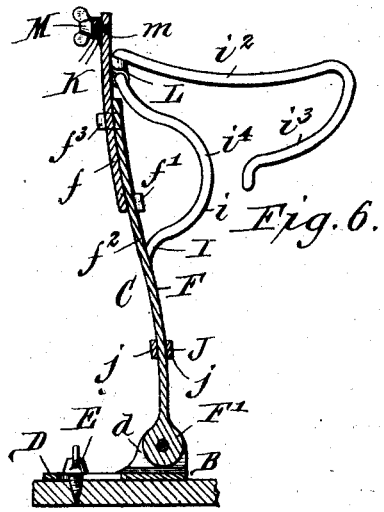
Witnesses:
Harry D. Rapp.
Christ Feinle Jr.
Frederick W. C. Pohle, Inventor.
By Emil Neuhart,
Attorney.

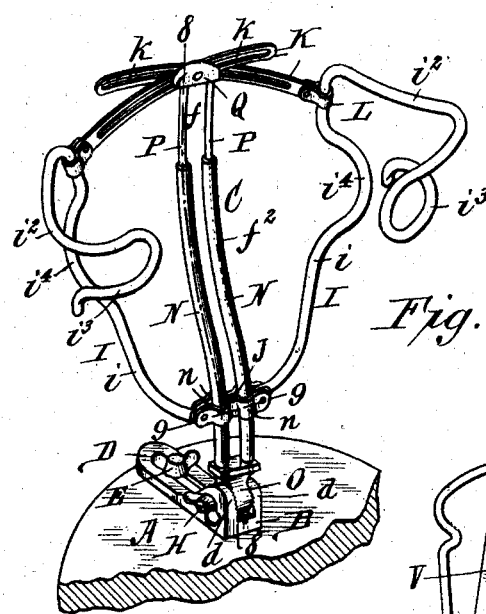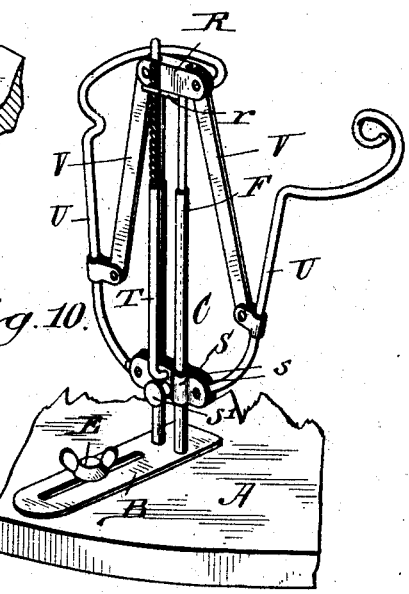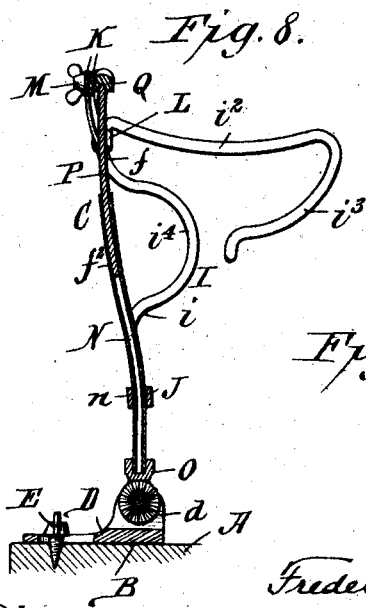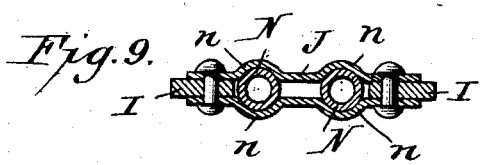

UNITED STATES PATENT OFFICE.

FREDERICK W. C. POHLE, OF BUFFALO, NEW YORK, ASSIGNOR TO POHLE-WERNER MANUFACTURING COMPANY, OF BUFFALO, NEW YORK, A CORPORATION OF NEW YORK.

PHOTOGRAPHIC POSING DEVICE.

No. 908,800.      Specification of Letters Patent.      Patented Jan. 5, 1909.

Application filed March 13, 1908. Serial No. 420,842.

*To all whom it may concern:*

Be it known that I, FREDERICK W. C. POHLE, a citizen of the United States, and a resident of Buffalo, in the county of Erie and State of New York, have invented certain new and useful Improvements in Photographic Posing Devices, of which the following is a specification.

My invention relates to improvements in photographic posing-devices, particularly designed for supporting and holding children in the desired pose while photographing them.

It has for its primary object the production of a device of this character which can be attached to any style chair or similar object upon which the subject to be photographed is to be seated; to construct the back support of the device that it will conform to the back of a child; and to so arrange and connect the various parts that no portion of the device will be visible from the point of view from which the photograph is to be taken.

A further object is to provide simple and effective means whereby the inclination of the device may be adjusted with relation to the foundation to which the device is secured, so that under all conditions of use, it will comfortably hold the subject to be photographed without cramping or pressing it at any point; and to otherwise improve on devices of this character with a view of simplifying it and increasing its adaptability to subjects of various forms and sizes.

It also has for its object the production of adjustable retainer-arms, so formed as to come in contact with the sides of the body at different points and with a view of increasing the contact surface so as to render the device comfortable to the subject when held thereby.

With these and other objects in view, the invention consists in the construction, arrangement and combination of parts to be hereinafter described and particularly pointed out in the subjoined claims.

In the drawings,—Figure 1 is a perspective view of my invention showing the same attached to a suitable foundation. Fig. 2 is a rear elevation of the device. Fig. 3 is an enlarged horizontal section taken on line 3—3, Fig. 2. Fig. 4 is an enlarged side elevation of the lower end of the back-support. Fig. 5 is an enlarged detached perspective view of the base. Fig. 6 is a vertical section taken on line 6—6, Fig. 1. Fig. 7 is a perspective view of a device embodying my invention with a modified form of back-support; the device being secured to a suitable foundation. Fig. 8 is a vertical section taken on line 8—8, Fig. 7. Fig. 9 is an enlarged horizontal section taken on line 9—9, Fig. 7. Fig. 10 is a perspective view of a further modified form of my invention, viewed from the rear.

Referring now to the drawings in detail, similar letters of reference refer to similar parts in the several figures.

The letter A designates a portion of a stool, chair or other foundation, to which my improved device is adapted to be secured. The device comprises a base or securing-member B and a supporting-member C adjustably secured to said base or securing-member. The latter consists, in preferred form, of a slotted plate D having at its forward end two upstanding lugs $d$ whose opposing faces are radially grooved to provide an annular series of gripping-teeth $d^1$. Said lugs are also provided with alined openings $d^2$, $d^3$; the latter being threaded for a purpose to presently appear.

Passing through the slot of the plate D is a thumb-screw E which is adapted to secure the base to the stool or other foundation, and by reason of said slot, the base may be adjusted to the desired position on the foundation by loosening said screws, and after being set in the position desired, again tightening said thumb-screw, which holds the device securely to the foundation.

In order that the device may be used on subjects of different heights, I provide an extension back-rest F which in preferred form, consists of an upper section $f$ having at its lower end a pair of forwardly and inwardly directed lugs $f^1$ and a lower section $f^2$ which is embraced by the lugs on the upper section and provided with a pair of rearwardly and inwardly extending lugs $f^3$ that embrace the upper section. While this is now thought to be the most practicable form of extensible back-rest for this purpose, it is of course apparent that any other extensible back-rest may be substituted therefor, such for example, as shown in Figs. 7 to 10.

With reference to Figs. 1 to 6, the lower end of the back-rest is provided with a circular enlargement $F^1$ which has a central opening G adapted to register with the openings $d^2$, $d^3$ in the lugs $d$ of the base, opposite sides of said enlargement being radially grooved to form gripping-teeth $g$ adapted to coöperate with those on the inner sides of the lugs $d$. In order to adjust the back-rest F and lock the same against movement, the coöperating-gripping teeth must interlock, and for this purpose I provide a thumb-screw H which is passed through the opening $d^2$ in one of the lugs and the opening G in the enlargement of the back-rest and takes into the threaded openings $d^3$ in the other lug. The tightening of said thumb-screw causes the lugs $d$ to be drawn inward into locking engagement with the enlargement F of the back-rest.

In order to hold the subject to be photographed in the desired position, I have provided retainer-arms I which are pivotally secured at their inner or lower ends to a slide-head J movable on the lower member $f^2$ of the back-rest; said slide-head comprising two transverse bars $j$ lying on opposite sides of the back-rest and preferably in frictional contact therewith so that by exerting pressure upward or downward against said slide-head, it can be adjusted to the desired position and held in such position by its frictional contact with said back-rest. The bars $j$ are somewhat longer than the width of the back-rest so that they project beyond opposite edges of the latter, and between said projecting ends the holding or retainer-arms I are pivotally secured, as best shown in Fig. 3. Said retainer-arms are preferably formed of wire curved upward and outward from their pivotal points of connection to said slide-head, as at $i$, thence forward at an angle to the parts $i$ to form retainer-portions $i^2$ which are oppositely curved to conform to the body of the child and which terminate in downwardly and rearwardly extending portions $i^3$. The upwardly and outwardly curved portions $i$ are curved forward, as at $i^4$, in line with the terminal portions $i^3$ of the retaining-arms; said portions $i^4$ and $i^3$ serving with the oppositely curved retaining portions $i^2$ to provide a holding-portion of considerable area so that the subject being photographed will not be pressed by the wire at any one point, thus assuring a gentle and even pressure against the body over considerable area and thereby positively avoiding cramping or undue pressure against the body. The holding arms are adapted to lie against opposite sides of a child with the oppositely curved retainer portions $i^2$ directly beneath the arm-pits, while the back of the child receives support from the back-rest F.

In order to adjust the retainer-arms laterally so as to hold the same in any adjusted position, brace-arms K are provided. These brace-arms are pivotally connected to clips L soldered or otherwise affixed to the retainer-arms at or near the upper ends of their upwardly and outwardly curved portions $i$, and said brace-arms are oppositely curved and longitudinally slotted, as at $k$, and adjustably secured to the upper end of the back-rest, or more particularly to the upper end of the upper section $f$ of said back-rest. A thumb-screw M passes through the slots $k$ of said brace-arms and takes into a threaded opening $m$ in said back-rest. The brace-arms cross each other, as clearly shown and upon loosening said thumb-screw, they may be moved outward or inward to force the retainer-arms into the desired position; the upper section of the back-rest sliding automatically on the lower section of said rest when said brace-arms are moved to adjust the retainer-arms; or if desired, the upper section, the retainer-arms, and the brace-arms may be adjusted bodily on the lower section. By making the back-rest extensible it does not rise above the brace-arms, and therefore, all parts of the device are hidden by the subject being photographed. When used in posing infants having loosely-fitting clothing, the entire device may be placed underneath the dress of the infant.

In Figs. 7 to 9, I have shown the back-rest in a slightly modified form wherein tubing N is secured to a clamping-head O, which together form the lower section of the back-rest, and two solid bars P which enter the tubing and are connected at their upper ends by a head Q; said bars and head forming the upper section of the back-rest. The slide-head J in this construction is bulged outward, as at $n$, to conform to the tubing N, and the brace-arms K are adjustably held on the head Q.

In the modification shown in Fig. 10, the back-rest F is also formed of tubing and solid bars entering the tubing, but in this construction the tubes are immovably secured to the base B. The upper ends of the solid bars are connected by a head R having a rearwardly extending loop $r$. A slide-head S is movable on the tubes constituting the lower section of the back-rest and it comprises two plates $s$ lying on opposite sides of the tubes and provided with a clamping-screw $s^1$ which passes loosely through an opening in one plate and takes into the other plate. In this manner, the slide can be positively held in any desired position on the back-rest. If desired, this clamping-screw or any other clamping-device may be employed in connection with the constructions hereinbefore described.

Secured to the slide-head S is a toothed spring-bar T which extends upward in rear of the back-rest and passes through the loop $r$ with which one of the teeth on said bar is adapted to engage. Holding or retainer-arms U are pivotally secured to opposite ends of said slide-head and extend upward and outward therefrom, they being pivotally connected with the head R at the upper end of the back-rest by upwardly and inwardly-directed brace-arms.

Having thus described my invention, what I claim is,—

1. In a posing-device, the combination of a telescopic back-rest, oppositely directed retainer-arms carried on said back-rest a distance from its upper end, and brace-arms connecting said retainer-arms with the upper extremity of said back-rest.

2. In a posing-device, the combination of a back-rest comprising two sections movable one upon the other, oppositely-directed retainer-arms carried on one of said sections, and brace-arms connecting said retainer-arms with the other of said sections.

3. In a posing-device, the combination of an extensible back-rest, upwardly and outwardly directed retainer-arms having holding-portions at their upper ends and being pivotally connected at their lower ends to said back-rest, and brace-arms connecting the upper ends of said retainer-arms with the upper end of said back-rest.

4. In a posing-device, the combination of a back-rest, retainer-arms pivotally secured to said back-rest, and slotted brace-arms secured to said retainer-arms and adjustably connected with said back-rest.

5. In a posing-device, the combination with a back-rest comprising a lower section and an upper section movably supported by said lower section, a slide-head on said lower section, retainer-arms pivotally secured to said slide-head and extending upward with terminal holding-portions, brace-arms pivotally connected to the upper ends of said retainer-arms and being directed inward and upward for adjustable connection with the upper end of the upper section of said back-rest.

6. In a posing-device, the combination of a back-rest comprising an upper and a lower section arranged for extension, a slide-head adjustable on said lower section, a pair of oppositely disposed retainer-arms, slotted brace-arms crossing each other and having their outer ends pivotally connected to said retainer-arms, and a thumb-screw passing through the slots of said brace-arms at the point of crossing and entering the upper end of the upper section of said back-rest.

7. In a posing-device, the combination of a back-rest comprising a lower section and an upper section movable on said lower section, a slide-head on said lower section, retainer-arms formed of wire pivotally connected at their lower ends to said slide-head and from such point being directed upward and outward, thence forward and finally downward and inward, said forwardly directed portions being oppositely curved and the upwardly and outwardly directed portions having forwardly directed curved portions in line with the free terminals of the wires forming said arms, upwardly and inwardly directed slotted brace-arms crossing each other in rear of the upper section of the back-rest at the upper end of the same and having pivotal connection with said retainer-arms, and a thumb-screw passed through the slots of said brace-arms at their point of crossing and entering said upper section.

8. In a posing-device, the combination of a back-rest, retainer-arms pivotally attached at their lower ends to said back-rest, slotted brace-arms crossing each other and having their outer ends pivotally connected to said retainer-arms, and a thumb-screw passing through the slots of said brace-arms and entering said back-rest.

9. In a posing-device, the combination with a back-rest, retainer-arms formed of wire pivotally connected at one of their ends to said back-rest and from such points being curved upward and outward and provided with forwardly curved portions near their upper ends, the upper ends of said wires being continued forward and curved outward, and thence directed downward and rearward to terminate beneath said forwardly and outwardly curved portions, and brace-arms connecting said retainer-arms with the back-rest.

10. In a posing-device, the combination of a back-rest comprising a lower section and an upper section, said lower section having rearwardly directed L-shaped ears embracing said upper section and the latter having forwardly directed L-shaped ears embracing said lower section, a slide-head movable on said lower section, upwardly and outwardly directed retainer-arms pivotally attached to said slide-head and having holding-portions at their upper ends, crossed brace-arms pivotally connected at their outer ends to said retainer-arms and slotted longitudinally, and a binding-screw passing through the slots of said brace-arms and entering the upper end of said back-rest.

In testimony whereof, I have affixed my signature in the presence of two subscribing witnesses.

FREDERICK W. C. POHLE.

Witnesses:
   CHRIST FEINLE, Jr.,
   HARRY D. RAPP.